US011069116B2

(12) United States Patent
Ebrahimi et al.

(10) Patent No.: US 11,069,116 B2
(45) Date of Patent: Jul. 20, 2021

(54) HYBRID STRUCTURAL-GEOMETRIC TECHNIQUE FOR PERFORMING DRAPING SIMULATION OF WOVEN FABRIC COMPOSITES

(71) Applicant: AUTODESK, INC., San Rafael, CA (US)

(72) Inventors: Mehran Ebrahimi, Toronto (CA); Massimiliano Moruzzi, Toronto (CA); Francesco Iorio, Toronto (CA)

(73) Assignee: AUTODESK, INC., San Rafael, CA (US)

(*) Notice: Subject to any disclaimer, the term of this patent is extended or adjusted under 35 U.S.C. 154(b) by 0 days.

(21) Appl. No.: 15/953,351

(22) Filed: Apr. 13, 2018

(65) Prior Publication Data

US 2019/0259192 A1 Aug. 22, 2019

Related U.S. Application Data

(60) Provisional application No. 62/633,550, filed on Feb. 21, 2018.

(51) Int. Cl.
*G06T 15/00* (2011.01)

(52) U.S. Cl.
CPC .................................. *G06T 15/005* (2013.01)

(58) Field of Classification Search
None
See application file for complete search history.

(56) References Cited

U.S. PATENT DOCUMENTS 6,256,038 B1 * 7/2001 Krishnamurthy ..... G06T 11/203 345/419
6,476,804 B1 * 11/2002 Costabel ................ G06T 13/20 345/419
6,509,899 B1 * 1/2003 Anderson .............. G06T 13/20 345/473
2005/0197731 A1 * 9/2005 Ahn ....................... G06T 13/20 700/130
2009/0018803 A1 * 1/2009 Ko ......................... G06T 17/20 703/2

(Continued)

OTHER PUBLICATIONS

A System for Modelling and Visualization of Cloth Material HN NG, Grimsdale, 1995.*

(Continued)

*Primary Examiner* — Jason A Pringle-Parker
(74) *Attorney, Agent, or Firm* — Artegis Law Group, LLP

(57) ABSTRACT

One embodiment of the present invention sets forth a technique for performing a draping simulation of a fabric that includes obtaining a problem definition that includes a fabric cell size, a spring constant ratio, and a three-dimensional (3D) surface. The technique also includes representing the fabric as a set of fabric cells with dimensions that adhere to the fabric cell size, modeling the fabric cells based on a set of side springs and a set of diagonal springs, and setting a first spring constant of the side springs and a second spring constant of the diagonal springs based on the spring constant ratio. The technique further includes propagating the fabric cells along the 3D surface according to the fabric cell size, the first spring constant, and the second spring constant to generate a result of the draping simulation.

29 Claims, 8 Drawing Sheets

(56) References Cited

U.S. PATENT DOCUMENTS

| | | | | |
|---|---|---|---|---|
| 2013/0110482 A1* | 5/2013 | Ellens | G06F 30/20 | |
| | | | 703/6 | |
| 2014/0225888 A1* | 8/2014 | Bell | G06T 17/00 | |
| | | | 345/419 | |
| 2014/0358495 A1* | 12/2014 | Belmans | G06F 17/5009 | |
| | | | 703/1 | |
| 2017/0337303 A1* | 11/2017 | Cirio | G06F 17/12 | |

OTHER PUBLICATIONS

Plausible cloth animation using dynamic bending model, Zhou, 2008.*
Decomposing Cloth, Eddy Boxerman, 2004.*
Adaptive meshing for cloth animation,. Villard, 2005.*
A new skeletal model for fabric drapes, Sze, 2005.*
Boisse et al., "Hypoelastic, hyperelastic, discrete and semi-discrete approaches for textile composite reinforcement forming", International journal of material forming, vol. 3 (2), 2010, pp. 1229-1240.
Boisse et al., "Different approaches for woven composite reinforcement forming simulation", , International journal of material forming, vol. 1(1), 2008., pp. 21-29.
Hamila et al., "Simulations of textile composite reinforcement draping using a new semi-discrete three node finite element", Composites Part B: Engineering, vol. 39(6), 2008, pp. 999-1010.
Peng et al., "A continuum mechanics-based non-orthogonal constitutive model for woven composite fabrics", Composites part A: Applied Science and manufacturing, vol. 36(6), 2005, pp. 859-874.
Aimene et al., "A Hyperelastic Approach for Composite Reinforcement Large Deformation Analysis", Journal of Composite materials, vol. 44, No. 1, 2010, pp. 5-26.
Kumar et al., "Geodesic curve computations on surfaces", Computer Aided Geometric Design, vol. 20(2), 2003, pp. 119-133.

* cited by examiner

HYBRID STRUCTURAL-GEOMETRIC TECHNIQUE FOR PERFORMING DRAPING SIMULATION OF WOVEN FABRIC COMPOSITES

CROSS-REFERENCE TO RELATED APPLICATIONS

This application claims the benefit of United States provisional patent application titled, "TECHNIQUES FOR PERFORMING DRAPING SIMULATIONS OF WOVEN FABRIC COMPOSITES," filed on Feb. 21, 2018 and having Ser. No. 62/633,550. The subject matter of this related application is hereby incorporated herein by reference.

BACKGROUND OF THE INVENTION

Field of the Invention

Embodiments of the present invention relate generally to computer-aided design, and more PARTICULARLY, to a hybrid structural-geometric technique for performing draping simulation of woven fabric composites.

Description of the Related Art

Advancements in automation and manufacturing techniques have increased the use of composite materials, also known as composite fabrics or composite textiles, in automotive, aerospace, marine, construction, and other industries. Such materials have a high strength to weight ratio, formability, and impact and corrosion resistance compared to metals. On the other hand, composite materials are typically associated with higher fabrication costs than metals. Consequently, accurately simulating the behavior of composite materials can be particularly useful in reducing overhead and overall cost when designing and/or manufacturing products that contain or are made of composite materials.

Existing approaches for simulating the draping of composite fabrics typically involve a tradeoff between speed and accuracy. A conventional geometric approach utilizes the geometric topology of a composite material to create a mesh from a flat two-dimensional (2D) fabric and convert the fabric into a three-dimensional (3D) design. A conventional finite element (FE) approach models the draping of the fabric over a 3D surface based on the geometric characteristics of the fabric, as well as material characteristics such as stretchability, shearing, adhesion, and/or elasticity. Accordingly, the geometric approach typically executes efficiently but can be somewhat inaccurate, while the FE approach typically requires significant computational overhead but can converge accurately on a solution that satisfies all boundary conditions.

As the foregoing illustrates, what is needed are more effective techniques for designing and manufacturing products that contain or are made up of composite materials and/or fabrics.

SUMMARY

One embodiment of the present invention sets forth a technique for performing a draping simulation of a fabric. The technique includes obtaining a problem definition that includes a fabric cell size, a spring constant ratio, and a three-dimensional (3D) surface. The technique also includes representing the fabric as a set of fabric cells with dimensions that adhere to the fabric cell size, modeling the fabric cells based on a set of side springs and a set of diagonal springs, and setting a first spring constant of the side springs and a second spring constant of the diagonal springs based on the spring constant ratio. The technique further includes propagating the fabric cells along the 3D surface according to the fabric cell size, the first spring constant, and the second spring constant to generate a result of the draping simulation.

At least one advantage of the disclosed techniques is that they employ a hybrid approach that combines geometric information related to the topology of the 3D surface with a simple representation of the fabric's structural characteristics to perform a draping simulation of the fabric over a 3D surface. As a result, the hybrid approach can be more accurate than a conventional geometric approach that uses only geometric topology to drape a 2D fabric over a 3D surface and can executed faster than a conventional FE approach that involves significant computational overhead before converging on a solution that satisfies a large number of boundary conditions. Thus, the hybrid approach provides technological improvements in the execution, efficiency, and/or accuracy of draping simulations of fabrics performed by computer systems or computer-aided design applications relative to prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
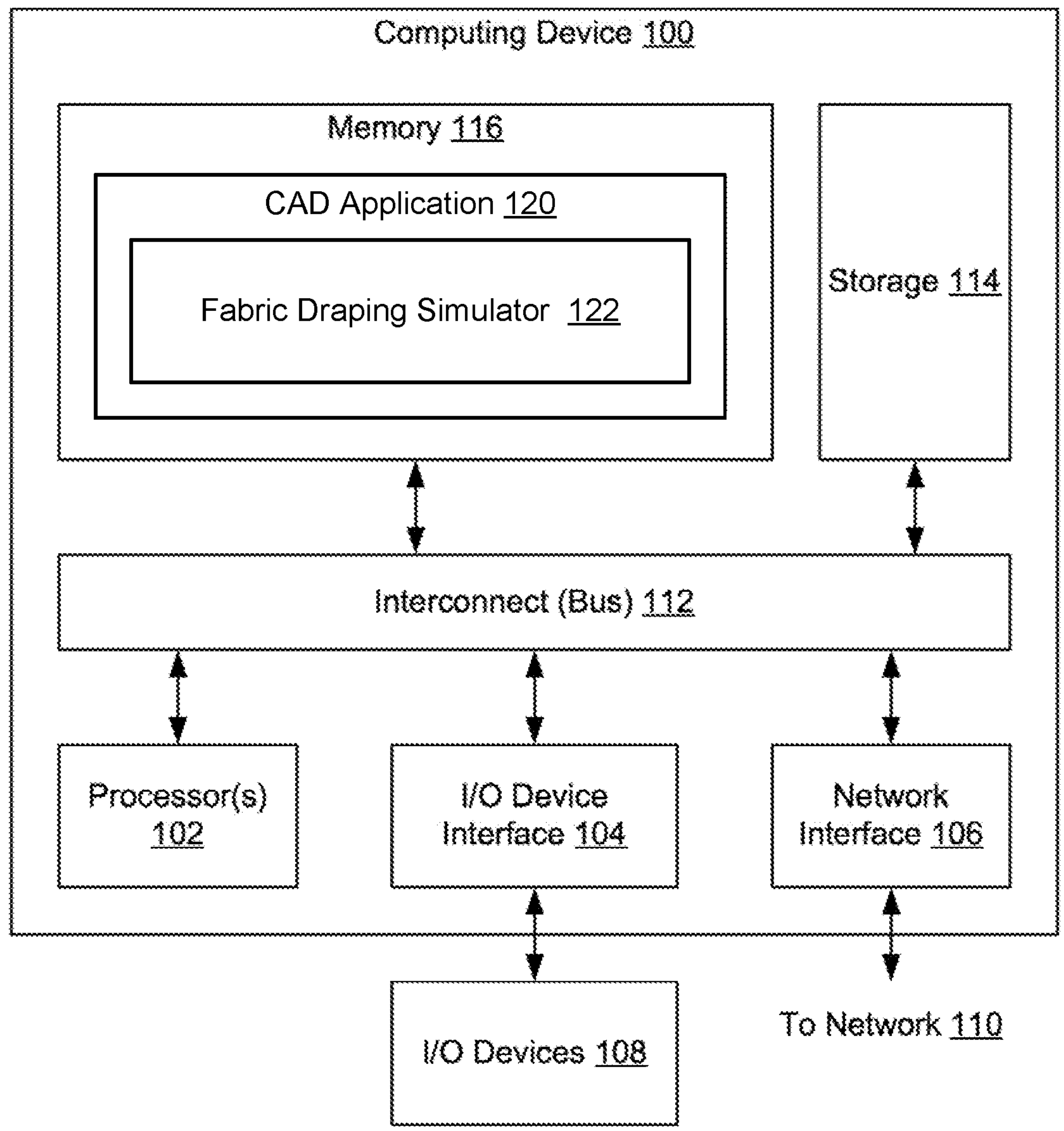
FIG. 1 illustrates a computing device configured to implement one or more aspects of the present invention.

FIG. 1 illustrates a computing device 100 configured to implement one or more aspects of the present invention. Computing device 100 may be a desktop computer, a laptop computer, a smart phone, a personal digital assistant (PDA), tablet computer, or any other type of computing device configured to receive input, process data, and optionally display images, and is suitable for practicing one or more embodiments of the present invention. Computing device 100 is configured to run productive congestion application 150 that resides in a memory 116. In some embodiments, computing device 100 is also configured to run space design application 118. It is noted that the computing device described herein is illustrative and that any other technically feasible configurations fall within the scope of the present invention.

As shown, computing device 100 includes, without limitation, an interconnect (bus) 112 that connects one or more processing units 102, an input/output (I/O) device interface 104 coupled to one or more input/output (I/O) devices 108, memory 116, a storage 114, and a network interface 106. Processing unit(s) 102 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit(s) 102 may be any technically feasible hardware unit capable of processing data and/or executing software applications, including positive congestion application 150. Further, in the context of this disclosure, the computing elements shown in computing device 100 may correspond to a physical computing system (e.g., a system in a data center) or may be a virtual computing instance executing within a computing cloud.

I/O devices 108 may include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 may be any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 may include non-volatile storage for applications and data, and may include fixed or removable disk drives, flash memory devices, and CD-ROM, DVD-ROM, Blu-Ray, HD-DVD, or other magnetic, optical, or solid state storage devices. Space design application 118 and productive congestion application 150 may be stored in storage 114 and loaded into memory 116 when executed. Additionally, one or more architectural space designs (not shown) and corresponding data may be stored in storage 114.

Memory 116 may include a random access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processor(s) 102 and application data associated with said software programs, including space design application 118 and productive congestion application 150.

Computer-aided design (CAD) application 120 may be used to create, modify, analyze, and/or optimize the design and/or manufacture of physical components. For example, CAD application 120 may be used to produce two-dimensional (2D) or three-dimensional (3D) models of objects such as buildings, engines, automotive parts, aerospace parts, prosthetics, tools, consumer products, clothing, and/or electronics.

Within CAD application 120, a fabric draping simulator 122 may be used to model the draping of fabrics over 3D surfaces. For example, fabric draping simulator 122 may be used to drape a carbon fiber, fiberglass, and/or other composite material over a 3D surface representing a mold for an automotive, aerospace, watercraft, and/or other mechanical part. In another example, fabric draping simulator 122 may be used to drape a textile material over a 3D surface representing a design for a shoe or piece of clothing.

In one or more embodiments, fabric draping simulator 122 includes functionality to perform hybrid structural-geometric draping simulation of fabrics, which can include composite fabrics and/or soft fabrics. As described in further detail below, the hybrid approach combines geometric information related to the topology of a 3D surface with a simple representation of the fabric's structural characteristics to perform a draping simulation of the fabric over a 3D surface. As a result, the hybrid approach may be more accurate than a conventional geometric approach that uses only geometric topology to drape a 2D fabric over a 3D surface and faster than a conventional FE approach that involves significant computational overhead before converging on a solution that satisfies a large number of boundary conditions.

Fabric Draping Simulator

Figure 2:
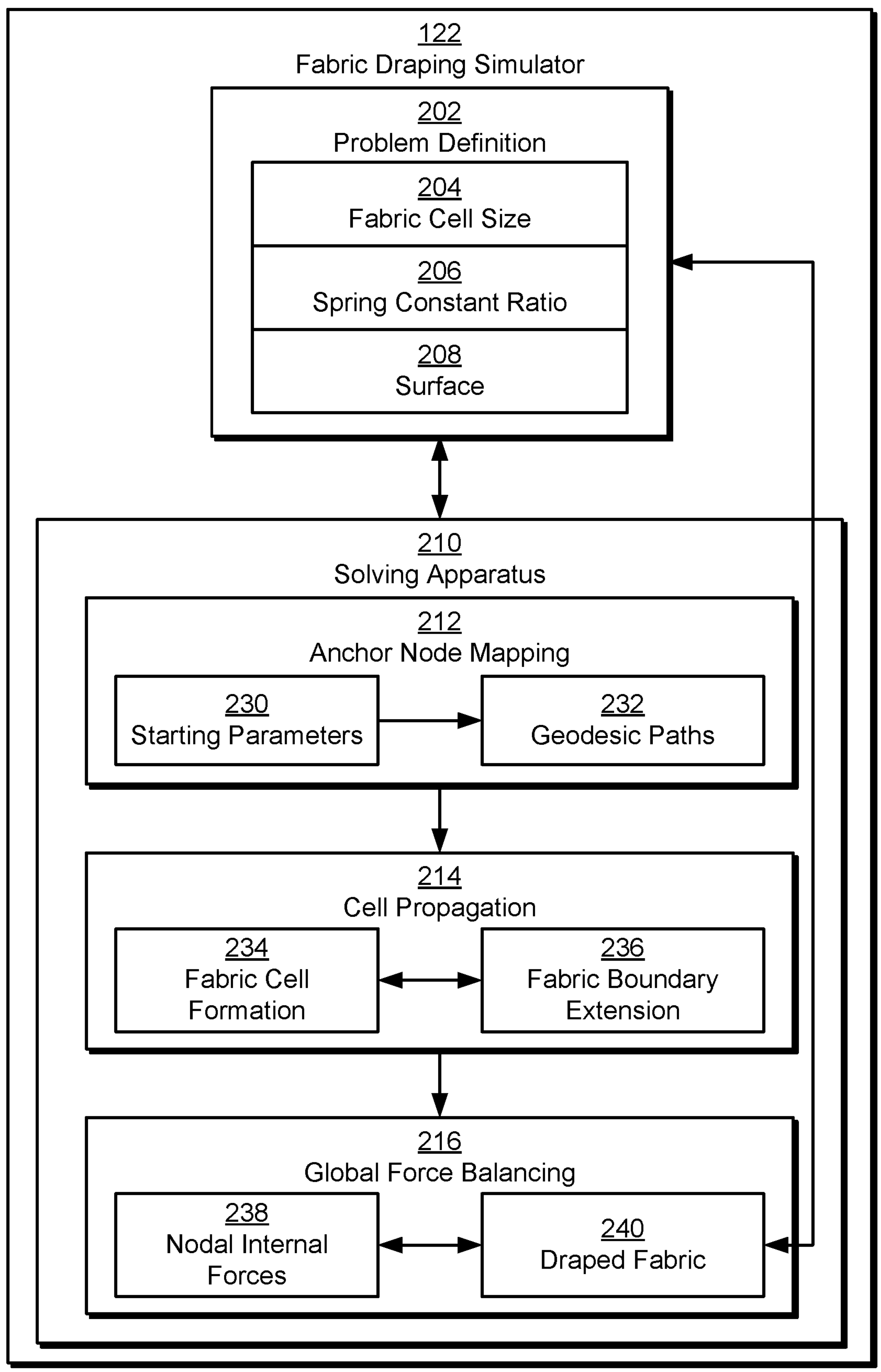
FIG. 2 is a more detailed illustration of the fabric draping simulator of FIG. 1, according to various embodiments of the present invention.

FIG. 2 is a more detailed illustration of the fabric draping simulator 122 of FIG. 1, according to various embodiments of the present invention. As shown, fabric draping simulator 122 includes a solving apparatus 210 that performs a draping simulation of a fabric according to a problem definition 202.

Problem definition 202 includes a set of parameters and/or constraints related to modeling of the draped fabric by fabric draping simulator 122. More specifically, fabric draping simulator 122 may represent the fabric as a set of contiguous fabric cells that are rectangular or square. For example, the fabric cells may form a grid in the fabric, with each fabric cell representing a repeatable interlacing or weave pattern of warp and weft fibers in the fabric.

Fabric draping simulator 122 may also model the structural characteristics of the material used in the fabric using four corner nodes in each fabric cell that are connected via a set of side springs and a set of diagonal springs. For example, each fabric cell may have four side springs and two diagonal springs. The side springs may be shared with adjacent fabric cells (i.e., to the top, bottom, left, and right of the fabric cell), while the diagonal springs may be internal to the fabric cell. Using springs to model fabric cells in fabric draping simulations is described in further detail below with respect to FIG. 3.

As a result, problem definition 202 includes a fabric cell size 204 that relates to the length and/or width of a series of contiguous rectangular or square fabric cells that represent the fabric. For example, fabric cell size 204 may reflect the repeatable pattern of yarns, threads, and/or fibers used to create the fabric. In another example, fabric cell size 204 may be specified by a user.

Problem definition 202 also includes a spring constant ratio 206 that represents the ratio in spring constants between the side springs and diagonal springs of the fabric cells. For example, spring constant ratio 206 may be calculated as $k_{side}/k_{diagonal}$, where $k_{side}$ represents the spring constant of the four side springs along the sides of each fabric cell and $k_{diagonal}$ represents the spring constant of the two diagonal springs in each fabric cell. A higher value for spring constant ratio 206 may represent a higher resistance of the fabric to stretching along the sides of the relative to stretching along the diagonals, which in turn increases the resistance of the fabric to shear and/or wrinkling.

In one or more embodiments, spring constant ratio 206 is experimentally determined for various fabric materials and included in problem definition 202 to improve the accuracy of fabric draping simulations performed by fabric draping simulator 122. For example, an isotropic fabric may have a value of 1 for spring constant ratio 206, while a composite fabric may have a much larger value for spring constant ratio 206.

Problem definition 202 further includes a 3D surface 208 over which the fabric is to be draped. For example, surface 208 may represent a mold or model for a part containing or composed of the fabric, such as a triangulated and/or tessellated 3D representation of a bicycle saddle, car body part, aircraft wing, shoe, and/or other physical object that incorporates the fabric.

After problem definition 202 is specified by a user and/or generated from other parameters (e.g., available fabric materials, weave patterns, surfaces, design options, etc.), solving apparatus 210 may use the parameters of problem definition 202 to carry out the draping simulation. First, solving apparatus 210 may perform an anchor node mapping 212 that generates a set of geodesic paths 232 (i.e. shortest paths) across surface 208 based on a set of starting parameters 230.

Starting parameters 230 may specify the initial location and/or orientation of geodesic paths 232. First, starting parameters 230 may include a starting point on surface 208 from which geodesic paths 232 are generated until a boundary of surface 208 is reached. The starting point may be selected by a user and/or determined by solving apparatus 210. For example, solving apparatus 210 may identify the starting point as the midpoint along one or more dimensions of surface 208. In another example, a user may use a cursor, touch-sensitive display, and/or other input mechanism to select the starting point on a graphical representation of surface 208.

Second, starting parameters 230 may include a fabric orientation at the starting point. For example, the fabric orientation may be represented by vectors that specify the warp and/or weft directions of the fabric. The fabric orientation may also, or instead, be represented using a guide curve from the starting point to a boundary of surface 208.

After a starting point and fabric orientation are obtained and/or selected, solving apparatus 210 may generate a set of geodesic paths 232 beginning at the starting point and running in perpendicular directions according to the fabric orientation until each geodesic path reaches a boundary of surface 208. For example, starting parameters 230 may include a starting point represented by $P_0$ and a fabric orientation that includes a warp direction of $t_0$ and a weft direction of $t_1$, which is perpendicular to the warp direction. As a result, solving apparatus 210 may calculate four geodesic paths 232 starting from $P_0$ along $t_0$, $t_1$, $-t_0$, and $-t_1$ until each geodesic path reaches a boundary of surface 208.

In another example, starting parameters 230 may include a starting point represented by $P_0$ and a guide curve (e.g., a user-defined curve on surface 208 on which anchor nodes are mapped) represented by $c_0$. To generate geodesic paths 232, solving apparatus 210 may calculate an additional geodesic path that passes through $P_0$ and is perpendicular to the guide curve.

After geodesic paths 232 are calculated, solving apparatus 210 may discretize geodesic paths 232 into a number of equidistant "anchor nodes" that adhere to fabric cell size 204. Such anchor nodes may represent the first fabric cell nodes to be placed along surface 208 and may remain fixed in position throughout the draping simulation. Generating geodesic paths and anchor nodes along surfaces during draping simulations of fabrics is described in further detail below with respect to FIG. 4.

The generation of anchor nodes in geodesic paths 232 may be illustrated by defining fabric cell size 204 by $L_{warp}$ and $L_{weft}$, which respectively represent the dimensions of each fabric cell along the warp and weft directions of the fabric. After geodesic paths 232 are calculated, solving apparatus 210 may discretize one or more geodesic paths 232 that run along the warp direction of the fabric into a series of equidistant anchor nodes separated by $L_{warp}$. Solving apparatus 210 may similarly discretize one or more geodesic paths 232 that run along the weft direction of the fabric into a series of equidistant anchor nodes separated by $L_{weft}$.

Because solving apparatus 210 generates perpendicular geodesic paths 232 from a starting point to the boundary of surface 208, geodesic paths 232 may divide surface 208 into four quadrants. Such division of surface 208 may allow solving apparatus 210 to perform subsequent steps in the draping simulation for each quadrant in parallel, thereby reducing computation time compared with conventional techniques that perform fabric draping simulation calculations in a sequential fashion.

After anchor nodes for the fabric cells are defined along geodesic paths 232, solving apparatus 210 may perform a cell propagation 214 that uses the anchor nodes to add additional nodes and fabric cells to surface 208. In a fabric cell formation 234 portion of cell propagation 214, solving apparatus 210 may add a fourth node to a set of three existing nodes to form a fabric cell. For example, solving apparatus 210 may add a fourth node to three nodes that are generated from the intersection of two geodesic paths 232. After the fourth node is added to the fabric cell, the fourth node may act as a third node in an adjacent fabric cell, thereby allowing a fourth node to be added to the adjacent fabric cell. In other words, the addition of a fourth node that completes a fabric cell may enable the addition of subsequent fourth nodes that complete additional fabric cells and propagate the fabric across surface 208, as described in further detail below with respect to FIGS. 5A-5C.

In addition, solving apparatus 210 may position each fourth node added in fabric cell formation 234 in a way that minimizes forces applied to the fourth node by springs connecting the fourth node and adjacent nodes in the fabric.

This minimization of force may reduce distortion and wrinkling in the fabric, thereby producing a draping simulation result that is more accurate and/or optimal than techniques that do not consider fabric material characteristics during draping simulations of fabrics across 3D surfaces.

For example, the fourth node of a fabric cell may be positioned in fabric cell formation 234 by solving the following force balance equation:

$$\sum_{i=1}^{N}(F_i)_{internal} = \sum_{i=1}^{N} k_i \Delta l_i \frac{\vec{X}_i - \vec{X}_{node\ 4}}{\|\vec{X}_i - \vec{X}_{node\ 4}\|_2} = 0,$$

$$\Delta l_i = l_i - (L_0)_i,$$

where N represents the number of springs connected to the fourth node, $\vec{X}_{node\ 4}$ represents the position of the fourth node on surface 208, $\vec{X}_i$ represents the position of the ith adjacent node to the fourth node, $k_i$ represents the spring constant of a spring between the adjacent fabric node and the fourth node, $l_i$ represents the length of the geodesic path connecting the fourth node to the adjacent node, and $(L_0)_i$ represents the fabric cell size in the direction along which the fourth node and the adjacent node lie. In turn, the equation may be used to solve for a value for $\vec{X}_{node\ 4}$ in an iterative fashion with a stopping criterion of $\Sigma_{i=1}^{N} F_i < \varepsilon$.

The process described above may be repeated for each node added during fabric cell formation 234. Moreover, the process may be parallelized in a number of ways. For example, fabric cell formation 234 may be performed in parallel for each quadrant of surface 208 formed by geodesic paths 232 and/or along the warp and weft directions of a newly completed fabric cell (e.g., after a fourth node is added to the fabric cell in a previous round of fabric cell formation 234).

Those skilled in the art will appreciate that fabric cell formation 234 may fail to propagate fabric cells along the entirety of surface 208 once a fourth node cannot be added to existing cells in the fabric. If a portion of surface 208 remains uncovered by the fabric after fabric cell formation 234 is complete, solving apparatus 210 may perform a fabric boundary extension 236 that adds one or more additional nodes to an outer boundary of the fabric. For example, solving apparatus 210 may perform fabric boundary extension 236 by locating the outer boundary of the fabric and adding a new node in the warp or weft direction past the outer boundary, as described in further detail below with respect to FIGS. 6A-6B.

As with nodes added in fabric cell formation 234, nodes added during fabric boundary extension 236 may be positioned to minimize forces applied to the additional nodes by springs connected to the additional nodes. For example, nodes added during fabric boundary extension 236 may be positioned using the same force balance equation as each fourth node added to a fabric cell during fabric cell formation 234. Fabric boundary extension 236 may also be performed in parallel along different quadrants of surface 208 and/or along warp and weft directions of the boundary of the fabric.

After additional nodes are added to the fabric via fabric boundary extension 236, solving apparatus 210 may use the additional nodes to perform additional rounds of fabric cell formation 234. Solving apparatus 210 may continue alternating between fabric cell formation 234 and fabric boundary extension 236 until the fabric cells have been propagated along the entirety of surface 208.

Solving apparatus 210 may then perform a global force balancing 216 step that balances nodal internal forces 238 in the fabric cells. For example, solving apparatus 210 may use the same force balance equation for positioning nodes during fabric cell formation 234 and fabric boundary extension 236 to iteratively reposition some or all nodes in the fabric so that forces on the nodes from springs connected to the nodes are minimized. Solving apparatus 210 may continue balancing nodal internal forces 238 until a certain number of iterations is reached and/or the sum of all forces in the fabric falls below a threshold. At the end of global force balancing 216, solving apparatus 210 may produce a draped fabric 240 with minimal distortion and/or wrinkling as a draping simulation result.

Solving apparatus 210 may further flatten the draping simulation result to obtain a 2D contour of draped fabric 240. In turn, the boundary of the 2D contour may be used as a pattern or line for cutting draped fabric 240 from a sheet of fabric material and/or to determine an orientation or position of the contour in a way that maximizes the number of cutouts from a given dimension of fabric material.

To flatten draped fabric 240 into a 2D representation, solving apparatus 210 may identify a set of nodes in the fabric that are closest to the boundary of surface 208 and use the nodes to determine a set of 2D coordinates of the boundary of surface 208. For example, the closest node of draped fabric 240 may be located for each boundary node B in a tessellated or triangulated representation of surface 208. Next, the 2D location of the boundary node on an xy-plane may be obtained using the following equations:

$$x = L_{warp} \times i \pm |\vec{l}_1|$$

$$y = L_{weft} \times j \pm |\vec{l}_2|$$

In the above equations, x represents the x-coordinate of the boundary node in the xy-plane, y represents the y-coordinate of the boundary node in the xy-plane, $L_{warp}$ represents the size of each fabric cell along the warp direction, and $L_{weft}$ represents the dimension of each fabric cell along the weft direction.

In addition, i and j represent the warp-weft indices of the fabric node that is closest to the boundary node. To obtain i and j, the starting point may be assigned a coordinate of (0, 0), i may be set to the displacement in fabric cells between the fabric node and the starting point along the warp direction, and j may be set to the displacement in fabric cells between the fabric node and the starting point along the weft direction. Finally, $l_1$ and $l_2$ represent the lengths of vectors that start at the boundary node, end at the sides of the fabric cell containing the boundary node and the closest fabric node, and are parallel to the local warp and weft directions of the fabric cell.

Solving apparatus 210 may optionally update spring constant ratio 206 and/or other parameters of problem definition 202 based on draped fabric 240. For example, solving apparatus 210 may iteratively adjust spring constant ratio 206 and/or fabric cell size 204 to reduce distortion and/or wrinkling in draped fabric 240 until nodal internal forces 238 fall below a threshold. Solving apparatus 210 may then include the updated spring constant ratio 206 and/or fabric cell size 204 in the result of the draping simulation. As a result, solving apparatus 210 may guide the user in selecting and/or preparing a fabric material with characteristics that produce an optimal draping result for a given surface 208.

The hybrid fabric draping simulation performed by solving apparatus 210 may further be used with techniques for performing dark insertion of fabric cutouts in surfaces with high curvature. For example, solving apparatus 210 and/or another component of the system may insert darts into areas with high distortion and/or wrinkling in draped fabric 240 in a way that minimizes both distortion and the number of cutouts in draped fabric 240.

Hybrid Draping Simulation Technique

Figure 3:
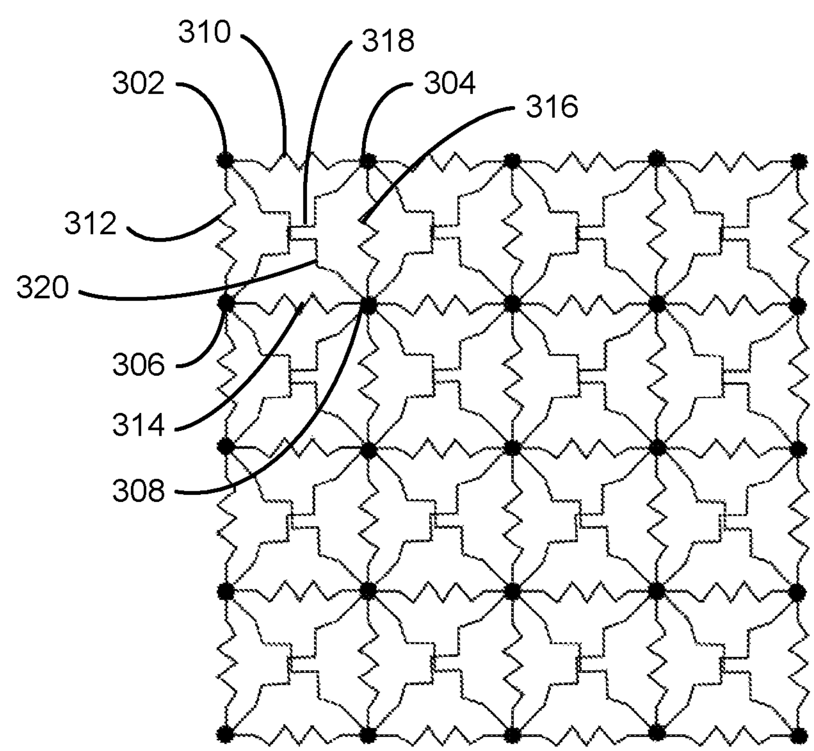
FIG. 3 is conceptual illustration of a set of fabric cells in a fabric for which the fabric draping simulator of FIG. 2 performs a simulation, according to various embodiments of the present invention.

FIG. 3 is conceptual illustration of a set of fabric cells in a fabric for which the fabric draping simulator 122 of FIG. 2 performs a simulation, according to various embodiments of the present invention. As mentioned above, the fabric cells may be rectangular and/or square and laid out in a contiguous grid. Within the grid, side springs are shared by adjacent cells, while diagonal springs are internal to each cell.

A fabric cell in the upper left corner of the grid includes four corner nodes 302-308 that define the dimensions of the fabric cell. Nodes 302 and 304 are connected by a side spring 310, nodes 302 and 306 are connected by a side spring 312, nodes 306 and 308 are connected by a side spring 314, and nodes 304 and 308 are connected by a side spring 316. Nodes 304 and 306 are connected by a diagonal spring 318, and nodes 302 and 308 are connected by a diagonal spring 320. Side spring 316 is shared with the fabric cell to the right, and side spring 314 is shared with the fabric cell below.

Figure 4:
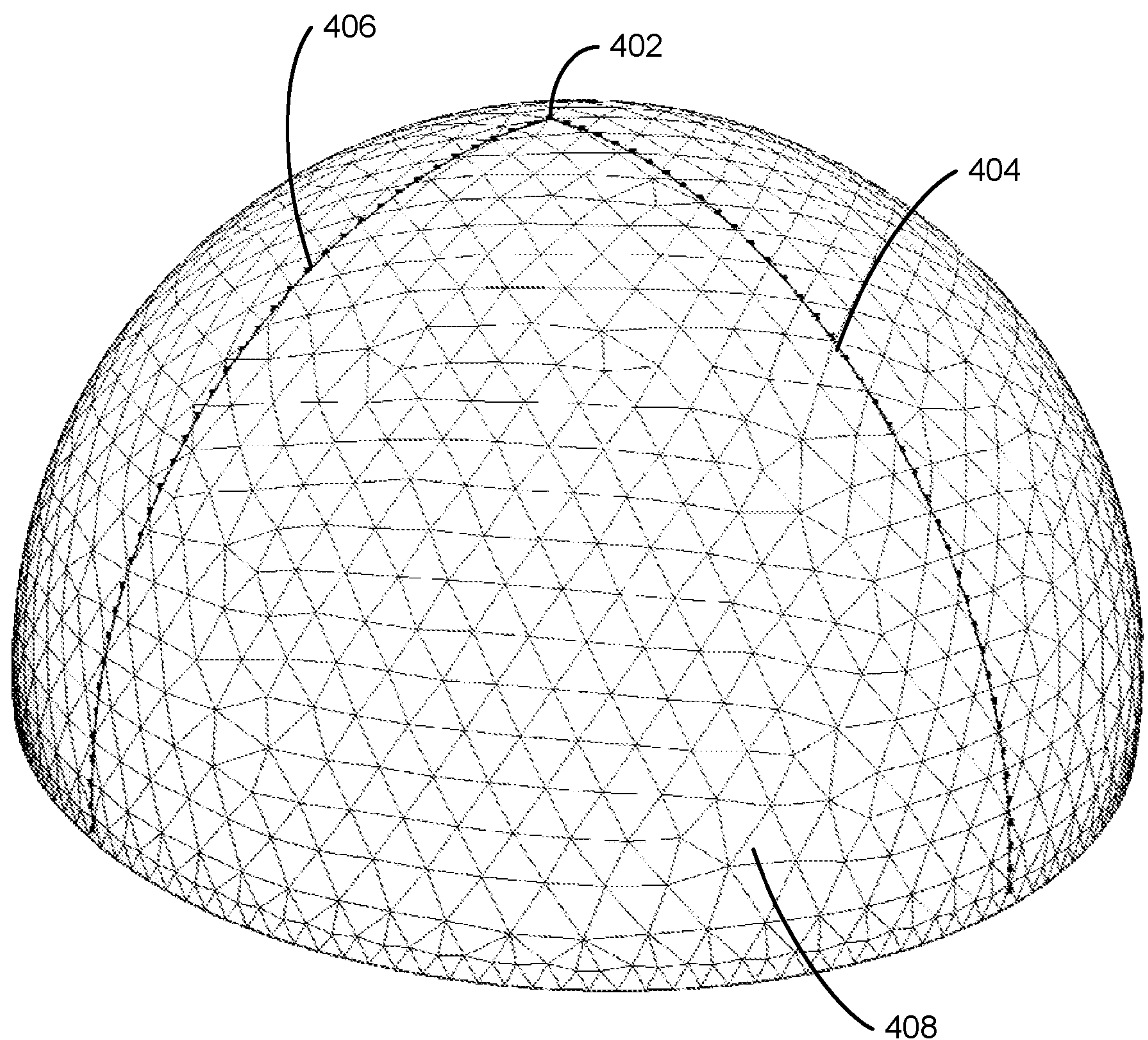
FIG. 4 is a conceptual illustration of a set of geodesic paths generated along a surface by the solving apparatus of FIG. 2, according to various embodiments of the present invention.

FIG. 4 is a conceptual illustration of a set of geodesic paths 404-406 generated along a surface by the solving apparatus 210 of FIG. 2, according to various embodiments of the present invention. As shown, surface 408 may be a triangulated representation of a hemisphere. To produce geodesic paths 404-406, a starting point 402 is obtained and/or selected on surface 408. For example, starting point 402 may be selected as the midpoint along one or more dimensions of surface 408 and/or obtained from a user.

Next, geodesic paths 404-406 may be calculated according to a fabric orientation from starting point 402 to the boundary of surface 408. For example, geodesic paths 404-406 may run along the warp and weft directions of a fabric to be draped over surface 408. Another set of geodesic paths (not shown) may similarly be generated in the opposite directions of geodesic paths 404-406 (i.e., the negative warp and weft directions) from starting point 402 to the boundary of surface 408.

After geodesic paths 404-406 are generated, geodesic paths 404-406 are discretized into a series of anchor nodes separated by distances that reflect a fabric cell size of the fabric. For example, one geodesic path may include anchor nodes that are separated by the fabric cell size along the warp direction of the fabric, and the other geodesic path may include anchor nodes that are separated by the fabric cell size along the weft direction of the fabric. The anchor nodes may then be used to propagate fabric cells, as described in further detail below with respect to FIGS. 5A-5C.

Figure 5A:
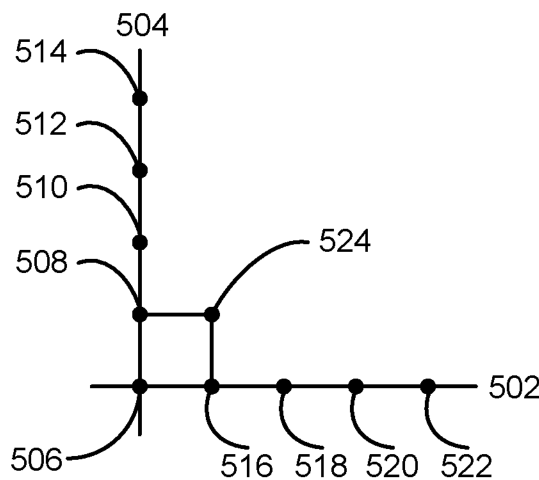
FIGS. 5A-5C are conceptual illustrations of fabric cells propagated along a three-dimensional (3D) surface by the solving apparatus of FIG. 2, according to various embodiments of the present invention.
Figure 5B:
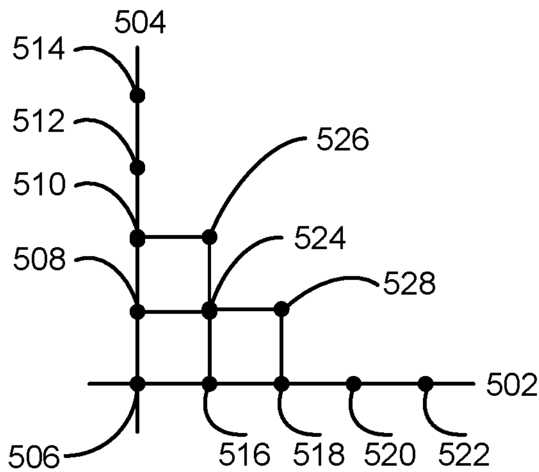
Figure 5C:
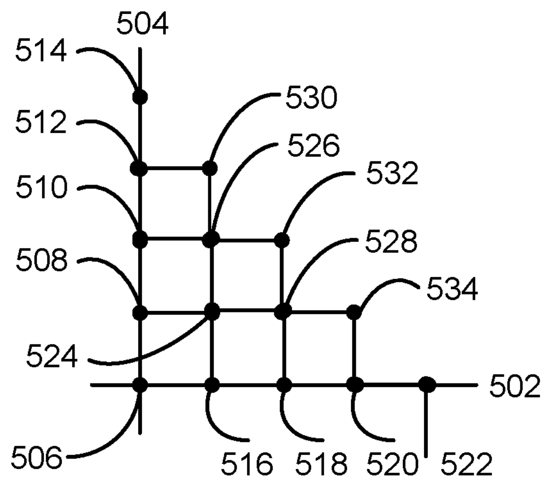

FIGS. 5A-5C are conceptual illustrations of fabric cells propagated along a three-dimensional (3D) surface by the solving apparatus 210 of FIG. 2, according to various embodiments of the present invention. As shown, two perpendicular geodesic paths 502-504 are plotted along the surface beginning at a node 506 that represents a starting point of geodesic paths 502-504. Path 502 includes four additional anchor points 516-522 to the right of node 506, and path 504 includes four additional anchor points 508-514 above node 506. Paths 502-504 may continue extending past points 508-514 and 516-522 until the boundary of the surface is reached.

Because paths 502-504 are perpendicular and intersect at node 506, nodes 506, 508, and 516 may define three corners of a rectangular or square fabric cell. As a result, a fabric cell formation 234 may be used to add a fourth node 524 to the fabric cell, as shown in FIG. 5A.

The added node 524 may allow additional nodes to be added to the fabric during a subsequent round of fabric cell formation. More specifically, nodes 516, 518, and 524 may form three nodes of a fabric cell to the right of the fabric cell defined by nodes 506, 508, 516, and 524, and nodes 508, 510 and 524 may form three nodes of another fabric cell above the fabric cell defined by nodes 506, 508, 516, and 524.

As shown in FIG. 5B, the subsequent round of fabric cell formation may be performed by adding one node 526 to complete the fabric cell formed by nodes 508, 510, and 524 and adding another node 528 to complete the fabric cell formed by nodes 516, 518, and 524. In turn, node 526 may act as a third node in one fabric cell that also includes nodes 510 and 512, node 528 may act as a third node in another fabric cell that also includes nodes 518 and 520, and nodes 524, 526, and 528 may form three nodes in a third fabric cell.

The creation of three fabric cells from the addition of nodes 526 and 528 to the fabric may enable another round of fabric cell formation that further propagates the fabric across the surface. As shown in FIG. 5C, a fourth node 530 is added to the fabric cell containing nodes 510, 512, and 526; a fourth node 532 is added to the fabric cell containing nodes 524, 526, and 528; and a fourth node 534 is added to the fabric cell containing nodes 518, 520, and 528.

Consequently, fabric cell formation may proceed by adding fourth nodes to fabric cells with three existing nodes until a fourth node cannot be added to existing fabric cells in the fabric. Moreover, each newly added node may be positioned in a way that minimizes forces applied to the node by side springs and diagonal springs connected to the node (e.g., from the other three nodes in the fabric cell), as discussed above.

Figure 6A:
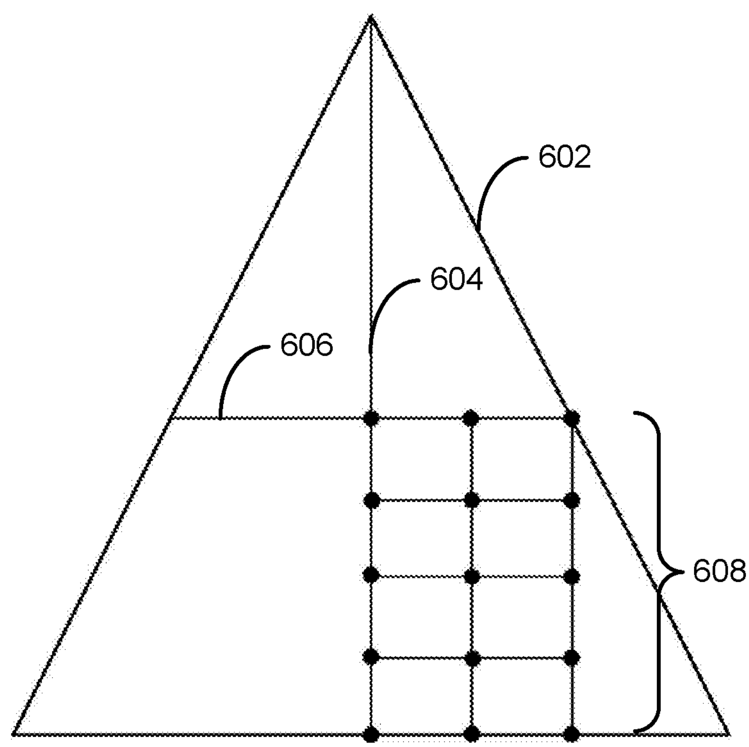
FIGS. 6A-6B are conceptual illustrations of fabric boundary extension along a 3D surface by the solving apparatus of FIG. 2, according to various embodiments of the present invention.
Figure 6B:
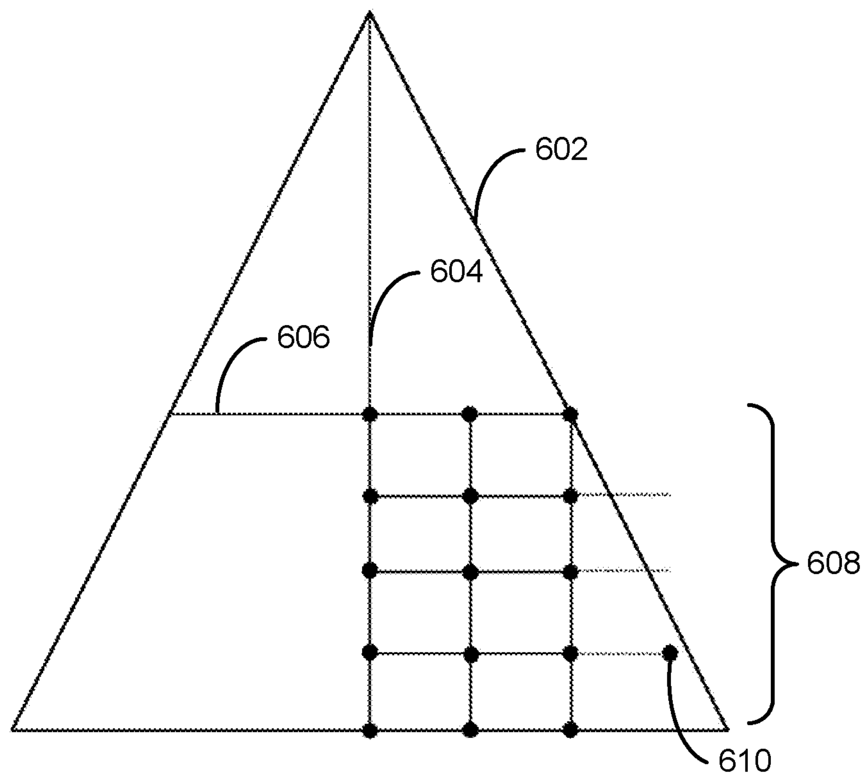

FIGS. 6A-6B are conceptual illustrations of fabric boundary extension in fabric cells 608 generated along a 3D surface 602 by the solving apparatus 210 of FIG. 2, according to various embodiments of the present invention. Fabric cells 608 may be propagated along a quadrant of surface 602 that is defined by two perpendicular geodesic paths 604-606.

As shown in FIG. 6A, fabric cells 608 do not include any nodes to which a fourth node can be added to complete a new fabric cell. To continue propagating the fabric along surface 602, an additional node 610 is added to the outer boundary of the fabric in FIG. 6B. As with nodes added during fabric cell formation, node 610 may be positioned in a way that minimizes forces applied to node 610 by one or more springs connected to node 610 (e.g., springs connecting node 610 and three nodes to the upper left, middle left, and lower left of node 610).

In turn, the newly added node 610 may allow additional fabric cell formation to be performed (e.g., by adding a fourth node below node 610 to complete a fabric cell at the bottom right corner of surface 602). Fabric cells may thus be propagated across surface 602 by alternating between fabric cell formation and fabric boundary extension until the fabric has covered the entirety of surface 602.

Figure 7:
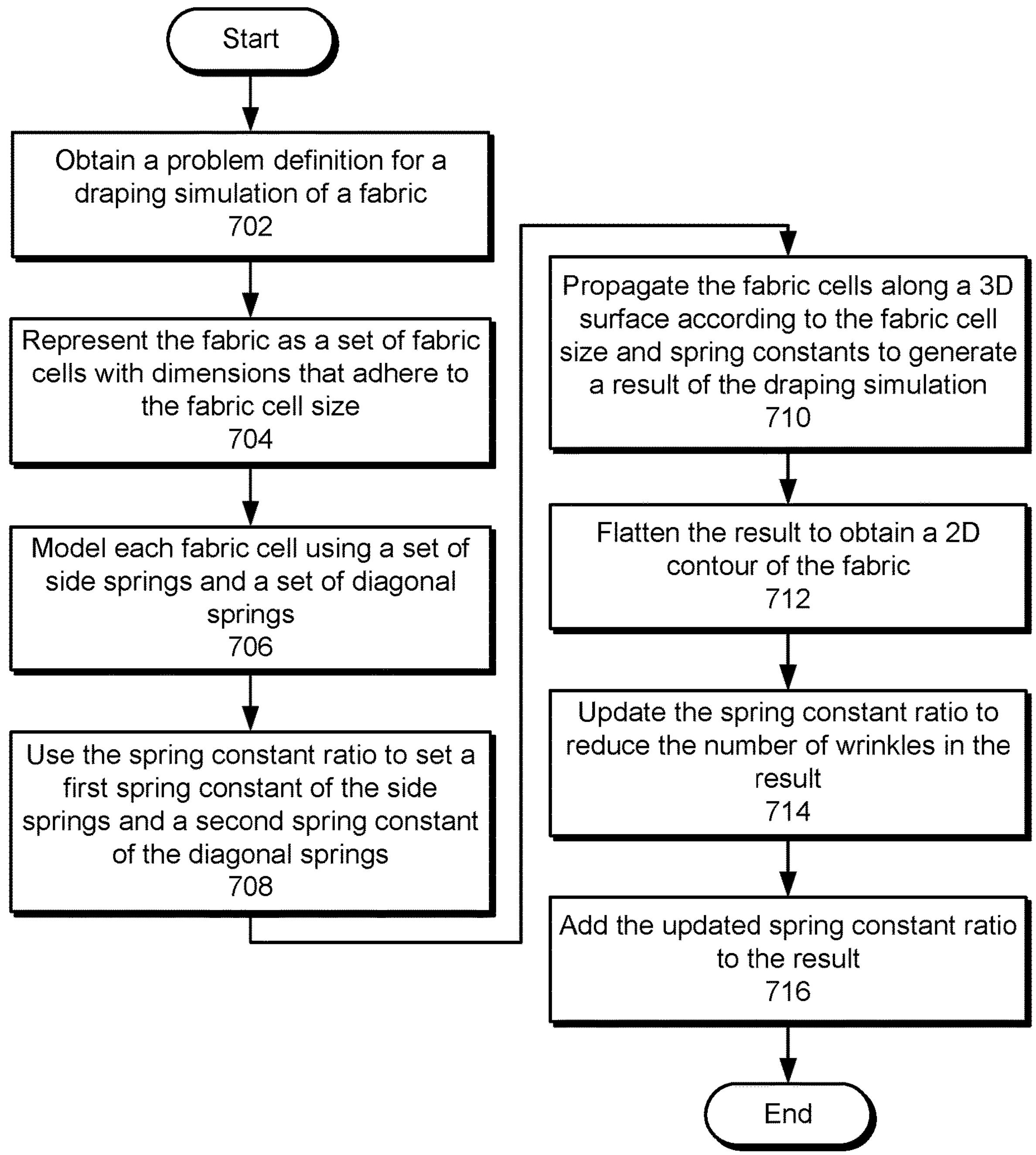
FIG. 7 is a flow diagram of method steps for performing a draping simulation of a fabric over a 3D surface, according to various embodiments of the present invention.

FIG. 7 is a flow diagram of method steps for performing a draping simulation of a fabric over a 3D surface, according to various embodiments of the present invention. Although the method steps are described in conjunction with the systems of FIGS. 1-2, persons skilled in the art will understand that any system configured to perform the method steps, in any order, is within the scope of the present invention.

As shown, solving apparatus 210 initially obtains a problem definition for the draping simulation (operation 702). The problem definition may include a fabric cell size, a spring constant ratio, and/or a 3D surface over which the fabric is to be draped. One or more parameters of the problem definition may be obtained from a user and/or selected based on a characteristic of the fabric. For example, the user may specify the fabric cell size, spring constant ratio, and/or 3D surface. In another example, the user may select an available fabric material and/or available surface over which the fabric material is to be draped, and solving apparatus 210 may set the fabric cell size and spring constant ratio based on experimentally determined and/or predefined characteristics of the fabric material.

Next, solving apparatus 210 represents the fabric as a set of fabric cells with dimensions that adhere to the fabric cell size (operation 704). For example, each fabric cell may be represented using four corner nodes that are positioned to reflect the fabric cell size along the warp and/or weft directions of the fabric.

Solving apparatus 210 also models each fabric cell using a set of side springs and a set of diagonal springs (operation 706). For example, each fabric cell may include four side springs along the sides of the fabric cell, as well as two diagonal springs along the interior of the fabric cell. Each side spring may connect two horizontally or vertically adjacent nodes in the fabric cell, and each diagonal spring may connect two diagonally adjacent nodes in the fabric cell.

Solving apparatus 210 further uses the spring constant ratio to set a first spring constant of the side springs and a second spring constant of the diagonal springs (operation 708). For example, solving apparatus 210 may select values of the first and second spring constants so that the spring constant ratio is produced by dividing the first spring constant by the second spring constant.

Solving apparatus 210 then propagates the fabric cells along the 3D surface according to the fabric cell size and spring constants to generate a result of the draping simulation (operation 710), as described in further detail below with respect to FIG. 8. Solving apparatus 210 also flattens the result to obtain a 2D contour of the fabric (operation 712). To obtain the 2D contour of the fabric, solving apparatus 210 may identify a set of nodes in the fabric that are closest to a boundary of the surface and use the identified set of nodes to determine a set of 2D coordinates of the boundary of the surface. In turn, the 2D coordinates may define the contour of the fabric.

Solving apparatus 210 further updates the spring constant ratio to reduce the number of wrinkles in the result (operation 714) and adds the updated spring constant ratio to the result (operation 716). For example, solving apparatus 210 may adjust the spring constant ratio to reduce wrinkling and/or distortion in the draped fabric when the wrinkling and/or distortion exceed a threshold. Solving apparatus 210 may then include the new spring constant ratio in the result to guide the selection and/or preparation of a fabric material with characteristics that enable optimal draping of the fabric over the surface.

Figure 8:
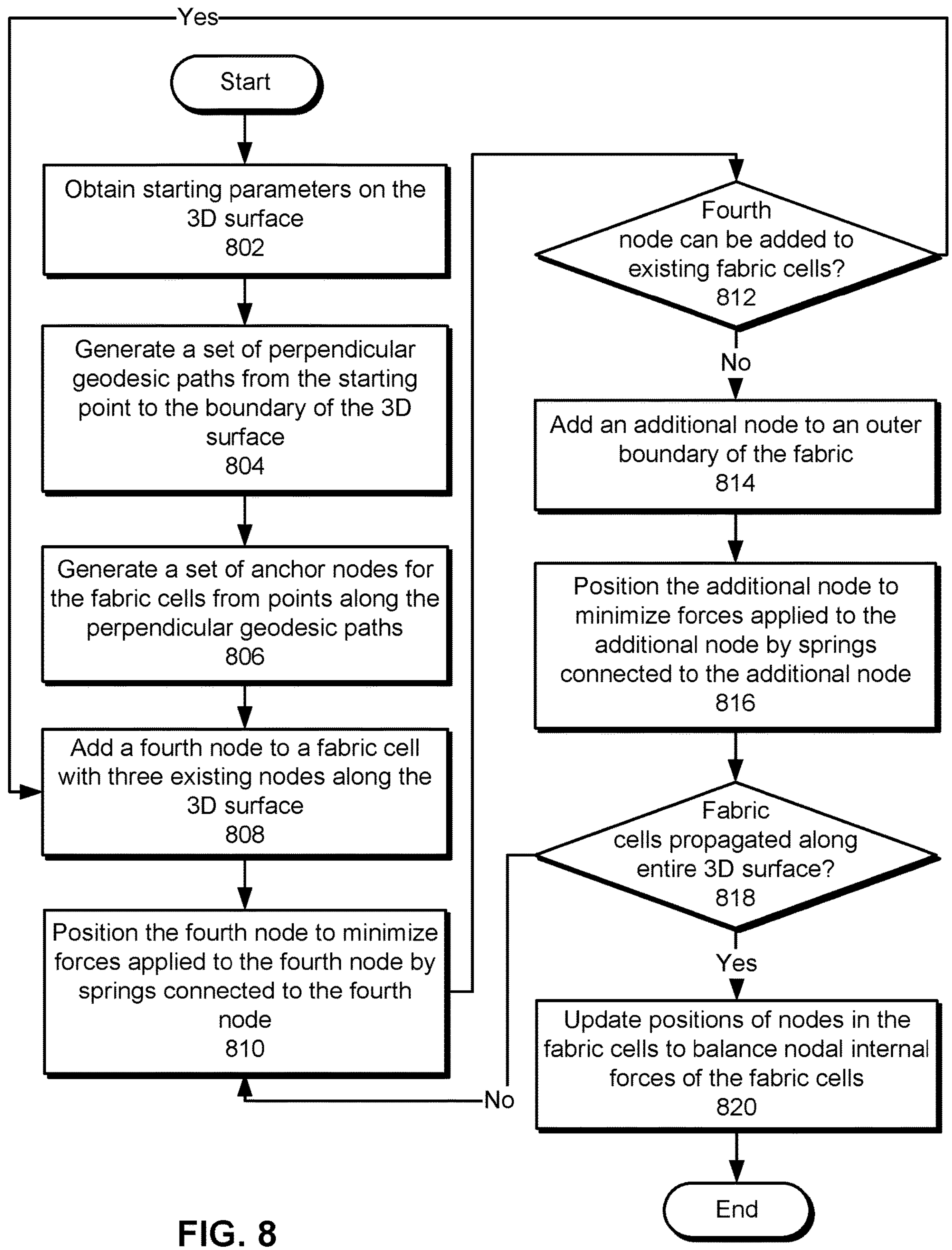
FIG. 8 is a flow diagram of method steps for generating a result of a draping simulation, according to various embodiments of the present invention.

FIG. 8 is a flow diagram of method steps for generating a result of a draping simulation, according to various embodiments of the present invention. Although the method steps are described in conjunction with the systems of FIGS. 1-2, persons skilled in the art will understand that any system configured to perform the method steps, in any order, is within the scope of the present invention.

As shown, solving apparatus 210 first obtains starting parameters on the 3D surface (operation 802) and generates a set of perpendicular geodesic paths from the starting point to the boundary of the 3D surface (operation 804). For example, solving apparatus 210 may select a starting point on the 3D surface to be a midpoint along one or more dimensions of the 3D surface and determine a fabric orientation at the starting point. Solving apparatus 210 may also, or instead, obtain the starting point and/or the initial fiber orientation from a user. Solving apparatus 210 may then calculate the perpendicular geodesic paths along the surface from the starting point in the warp and weft directions until each geodesic path reaches the boundary of the surface.

Next, solving apparatus 210 generates a set of anchor nodes for the fabric cells from points along the perpendicular geodesic paths (operation 806). For example, solving apparatus 210 may discretize each geodesic path into anchor nodes that are separated by the fabric cell size along the dimension in which the geodesic path lies.

Solving apparatus 210 then propagates the fabric cells along the surface using existing nodes in the fabric cells. In particular, solving apparatus 210 uses three existing nodes in a given fabric cell to position a fourth node in the fabric cell (operation 808). Moreover, solving apparatus 210 positions the fourth node to minimize forces applied to the fourth node by springs connected to the fourth node (operation 810). Solving apparatus 210 may repeat operation 808 while a fourth node can be added to existing fabric cells (operation 812) in the fabric.

When a fourth node can no longer be added to any existing fabric cells, solving apparatus 210 adds an additional node to the boundary of the fabric (operation 814). For example, solving apparatus 210 may add the additional node along the warp or weft direction of the fabric past the existing boundary of the fabric. As with other nodes added to the fabric, solving apparatus 210 positions the additional node to minimize forces applied to the additional node by springs connected to the additional node (operation 816). If the newly added node does not complete the propagation of the fabric cells along the entire 3D surface (operation 818), solving apparatus 210 may continue adding nodes using operations 810-816 until the fabric covers the entire 3D surface.

Finally, solving apparatus 210 updates positions of nodes in the fabric cells to balance nodal internal forces of the fabric cells (operation 820). For example, solving apparatus 210 may iteratively adjust the positions of the nodes until a certain number of iterations is reached and/or the sum of all forces in the fabric falls below a threshold. In turn, the balanced nodes and/or fabric cells may be included in the result of the draping simulation.

In sum, the disclosed techniques can be used to generate a draping simulation of a fabric, which can include composite fabrics and/or soft fabrics. To perform the draping simulation, the fabric is represented as a set of fabric cells with dimensions that adhere to a specified fabric cell size. Each fabric cell is further modeled using a set of side springs and a set of diagonal springs, and spring constants of the side springs and diagonal springs are selected to conform to a specified and/or determined spring constant ratio for the fabric. The draping simulation result is then generated by propagating the fabric cells along a 3D surface and adjusting the positions of corner nodes in the fabric cells to minimize nodal internal forces represented by springs connected to the corner nodes.

By representing a fabric using a set of fabric cells connected by springs with spring constants that reflect the material characteristics of the fabric, the disclosed techniques employ a hybrid structural-geometric approach when performing draping simulations of composite and/or soft fabrics. Such a hybrid approach is typically more accurate than a conventional geometric approach that uses only geometric topology to drape a 2D fabric over a 3D surface and faster than a conventional FE approach that involves significant computational overhead before converging on a solution that satisfies a large number of boundary conditions. The efficiency of the hybrid approach also enables the material characteristics of the fabric to be tuned in a way that minimizes distortions and/or wrinkling in the draped fabric, thereby providing guidance related to the type of material that should be used to optimally drape a fabric over a given 3D surface. Thus, the hybrid approach provides technological improvements in the execution, efficiency, and/or accuracy of draping simulations of fabrics performed by computer systems or computer-aided design applications relative to prior art approaches.

1. In some embodiments, a method comprises obtaining a problem definition that includes a fabric cell size, a spring constant ratio, and a three-dimensional (3D) surface; representing the fabric as a set of fabric cells with dimensions that adhere to the fabric cell size; modeling the fabric cells based on a set of side springs and a set of diagonal springs; setting a first spring constant of the side springs and a second spring constant of the diagonal springs based on the spring constant ratio; and propagating the fabric cells along the 3D surface according to the fabric cell size, the first spring constant, and the second spring constant to generate a result of the draping simulation.

2. The method of clause 1, further comprising flattening the result to obtain a two-dimensional (2D) contour of the fabric.

3. The method of clauses 1 or 2, wherein flattening the result to obtain the 2D contour of the fabric comprises identifying a set of nodes in the fabric that are closest to a boundary of the surface; and determine a set of 2D coordinates of the boundary of the surface based on the set of nodes.

4. The method of clauses 1-3, wherein propagating the set of fabric cells comprises obtaining a starting point on the 3D surface; generating a set of perpendicular geodesic paths from the starting point to a boundary of the surface; and generating a set of anchor nodes for the set of fabric cells from points along the set of perpendicular geodesic paths.

5. The method of clauses 1-4, wherein the set of perpendicular paths are generated using at least one of a fabric orientation and a guide curve.

6. The method of clauses 1-5, wherein propagating the set of fabric cells comprises minimizing forces applied to a fourth node in a fabric cell by springs connected to the fourth node.

7. The method of clauses 1-6, wherein propagating the set of fabric cells further comprises when the fourth node cannot be added to existing fabric cells in the fabric, adding an additional node to an outer boundary of the fabric; and positioning the additional node in the fabric in a way that minimizes forces applied to the additional node by springs connected to the additional node.

8. The method of clauses 1-7, wherein propagating the set of fabric cells further comprises updating positions of nodes in the set of fabric cells to balance nodal internal forces of the set of fabric cells when the set of fabric cells has been propagated along an entirety of the 3D surface.

9. The method of clauses 1-8, further comprising updating the spring constant ratio to reduce a number of wrinkles in the result; and adding the updated spring constant ratio to the result.

10. The method of clauses 1-9, wherein each fabric cell in the set of fabric cells comprises four side springs and two diagonal springs.

11. In some embodiments, a non-transitory computer readable medium stores instructions that, when executed by a processor, cause the processor to perform the steps of obtaining a problem definition for a draping simulation of a fabric, wherein the problem definition comprises a fabric cell size, a spring constant ratio, and a three-dimensional (3D) surface; representing the fabric as a set of fabric cells with dimensions that adhere to the fabric cell size; modeling the set of fabric cells based on a set of side springs and a set of diagonal springs; setting a first spring constant of the set of side springs and a second spring constant of the set of diagonal springs based on the spring constant ratio; and propagating the set of fabric cells along the 3D surface according to the fabric cell size, the first spring constant, and the second spring constant to generate a result of the draping simulation.

12. The non-transitory computer readable medium of clause 11, wherein the method further comprises flattening the result to obtain a two-dimensional (2D) contour of the fabric.

13. The non-transitory computer readable medium of clauses 11-12, wherein flattening the result to obtain the 2D contour of the fabric comprises identifying a set of nodes in the fabric that are closest to a boundary of the surface; and determining a set of 2D coordinates of the boundary of the surface based on the set of nodes.

14. The non-transitory computer readable medium of clauses 11-13, wherein propagating the set of fabric cells comprises obtaining a starting point on the 3D surface; generating a set of perpendicular geodesic paths from the starting point to a boundary of the surface; and generating a set of anchor nodes for the set of fabric cells from points along the set of perpendicular geodesic paths.

15. The non-transitory computer readable medium of clauses 11-14, wherein propagating the set of fabric cells comprises adding a fourth node to a fabric cell with three existing nodes along the 3D surface; and positioning the fourth node to minimize forces applied to the fourth node by springs connected to the fourth node.

16. The non-transitory computer readable medium of clauses 11-15, wherein propagating the set of fabric cells further comprises when the fourth node cannot be added to existing fabric cells in the fabric, adding an additional node to an outer boundary of the fabric; and positioning the additional node to minimize forces applied to the additional node by springs connected to the additional node.

17. The non-transitory computer readable medium of clauses 11-16, wherein propagating the set of fabric cells further comprises updating positions of the set of fabric cells to balance nodal internal forces of the set of fabric cells when the set of fabric cells has been propagated along an entirety of the 3D surface.

18. The non-transitory computer readable medium of clauses 11-17, wherein obtaining the problem definition for the draping simulation comprises at least one of obtaining a first parameter of the problem definition from a user; and selecting a second parameter of the problem definition based on a characteristic of the fabric.

19. The non-transitory computer readable medium of clauses 11-18, wherein the fabric comprises at least one of a composite fabric and a soft fabric.

20. In some embodiments, a system comprises a memory that stores instructions, and a processor that is coupled to the memory and, when executing the instructions, is configured to obtain a problem definition for a draping simulation of a fabric, wherein the problem definition comprises a fabric cell size, a spring constant ratio, and a three-dimensional (3D) surface; represent the fabric as a set of fabric cells with dimensions that adhere to the fabric cell size; model the set of fabric cells based on a set of side springs and a set of diagonal springs; set a first spring constant of the set of side springs and a second spring constant of the set of diagonal springs based on the spring constant ratio; and propagate the set of fabric cells along the 3D surface according to the fabric cell size, the first spring constant, and the second spring constant to generate a result of the draping simulation.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for performing a draping simulation of a fabric, the method comprising:

obtaining a problem definition comprising a fabric cell size, a spring constant ratio, and a three-dimensional (3D) surface;

representing the fabric as a set of fabric cells with dimensions that adhere to the fabric cell size;

modeling the set of fabric cells based on a set of side springs and a set of diagonal springs;

setting a first spring constant of the set of side springs and a second spring constant of the set of diagonal springs based on the spring constant ratio, wherein the spring constant ratio indicates a resistance of the fabric to stretching along sides of the set of fabric cells relative to stretching along diagonals of the set of fabric cells, wherein the spring constant ratio is determined prior to setting the first spring constant of the set of side springs; and propagating the set of fabric cells along the 3D surface according to the fabric cell size, the first spring constant, and the second spring constant to generate a result of the draping simulation.

2. The method of claim 1, further comprising flattening the result to obtain a two-dimensional (2D) contour of the fabric.

3. The method of claim 2, wherein flattening the result to obtain the 2D contour of the fabric comprises:

identifying a set of nodes in the fabric that are closest to a boundary of the surface; and determining a set of 2D coordinates of the boundary of the surface based on the set of nodes.

4. The method of claim 1, wherein propagating the set of fabric cells comprises:

obtaining a starting point on the 3D surface;

generating a set of perpendicular geodesic paths from the starting point to a boundary of the surface; and generating a set of nodes for the set of fabric cells along the set of perpendicular geodesic paths.

5. The method of claim 4, wherein the set of perpendicular geodesic paths are generated using at least one of a fabric orientation or a guide curve.

6. The method of claim 4, wherein propagating the set of fabric cells comprises minimizing forces applied to a first node in a first fabric cell by springs connected to the first node.

7. The method of claim 6, wherein propagating the set of fabric cells further comprises:

when the first node cannot be added to existing fabric cells in the fabric, adding an additional node to an outer boundary of the fabric; and positioning the additional node in the fabric in a way that minimizes forces applied to the additional node by springs connected to the additional node.

8. The method of claim 7, wherein propagating the set of fabric cells further comprises updating positions of the set of nodes in the set of fabric cells to balance nodal internal forces of the set of fabric cells when the set of fabric cells has been propagated along an entirety of the 3D surface.

9. The method of claim 1, further comprising:

updating the spring constant ratio to reduce a number of wrinkles in the result; and adding the updated spring constant ratio to the result.

10. The method of claim 1, wherein each fabric cell in the set of fabric cells comprises four side springs and two diagonal springs.

11. The method of claim 1, wherein the spring constant ratio is determined based on a type of material of the fabric.

12. The method of claim 11, wherein the fabric comprises an isotropic material and the spring constant ratio is determined to have an approximate value of 1.

13. The method of claim 11, wherein the fabric comprises a composite material and the spring constant ratio is determined to have a value greater than 1.

14. One or more non-transitory computer-readable media storing instructions that, when executed by one or more processors, cause the one or more processors to perform the steps of:

obtaining a problem definition for a draping simulation of a fabric, wherein the problem definition comprises a fabric cell size, a spring constant ratio, and a three-dimensional (3D) surface;

representing the fabric as a set of fabric cells with dimensions that adhere to the fabric cell size;

modeling the set of fabric cells based on a set of side springs and a set of diagonal springs;

setting a first spring constant of the set of side springs and a second spring constant of the set of diagonal springs based on the spring constant ratio, wherein the spring constant ratio indicates a resistance of the fabric to stretching along sides of the set of fabric cells relative to stretching along diagonals of the set of fabric cells, wherein the spring constant ratio is determined prior to setting the first spring constant of the set of side springs; and propagating the set of fabric cells along the 3D surface according to the fabric cell size, the first spring constant, and the second spring constant to generate a result of the draping simulation.

15. The one or more non-transitory computer-readable media of claim 14, wherein the method further comprises flattening the result to obtain a two-dimensional (2D) contour of the fabric.

16. The one or more non-transitory computer-readable media of claim 15, wherein flattening the result to obtain the 2D contour of the fabric comprises:

identifying a set of nodes in the fabric that are closest to a boundary of the surface; and determining a set of 2D coordinates of the boundary of the surface based on the set of nodes.

17. The one or more non-transitory computer-readable media of claim 14, wherein propagating the set of fabric cells comprises:

obtaining a starting point on the 3D surface;

generating a set of perpendicular geodesic paths from the starting point to a boundary of the surface; and generating a set of nodes for the set of fabric cells along the set of perpendicular geodesic paths.

18. The one or more non-transitory computer-readable media of claim 17, wherein propagating the set of fabric cells comprises:

adding a fourth node to a fabric cell with three existing nodes along the 3D surface; and positioning the fourth node to minimize forces applied to the fourth node by springs connected to the fourth node.

19. The one or more non-transitory computer-readable media of claim 18, wherein propagating the set of fabric cells further comprises:

when the fourth node cannot be added to existing fabric cells in the fabric, adding an additional node to an outer boundary of the fabric; and positioning the additional node to minimize forces applied to the additional node by springs connected to the additional node.

20. The one or more non-transitory computer-readable media of claim 19, wherein propagating the set of fabric cells further comprises updating positions of the set of fabric cells to balance nodal internal forces of the set of fabric cells when the set of fabric cells has been propagated along an entirety of the 3D surface.

21. The one or more non-transitory computer-readable media of claim 14, wherein obtaining the problem definition for the draping simulation comprises at least one of:

obtaining a first parameter of the problem definition from a user; and selecting a second parameter of the problem definition based on a characteristic of the fabric.

22. The one or more non-transitory computer-readable media of claim 14, wherein the fabric comprises at least one of a composite fabric or a soft fabric.

23. A system, comprising:

a memory that stores instructions, and a processor that is coupled to the memory and, when executing the instructions, is configured to:

obtain a problem definition for a draping simulation of a fabric, wherein the problem definition comprises a fabric cell size, a spring constant ratio, and a three-dimensional (3D) surface;

represent the fabric as a set of fabric cells with dimensions that adhere to the fabric cell size;

model the set of fabric cells based on a set of side springs and a set of diagonal springs;

set a first spring constant of the set of side springs and a second spring constant of the set of diagonal springs based on the spring constant ratio, wherein the spring constant ratio indicates a resistance of the fabric to stretching along sides of the set of fabric cells relative to stretching along diagonals of the set of fabric cells, wherein the spring constant ratio is determined prior to setting the first spring constant of the set of side springs; and propagate the set of fabric cells along the 3D surface according to the fabric cell size, the first spring constant, and the second spring constant to generate a result of the draping simulation.

24. A method for performing a draping simulation of a fabric, the method comprising:

obtaining a problem definition comprising a fabric cell size, a spring constant ratio, and a three-dimensional (3D) surface;

representing the fabric as a set of fabric cells with dimensions that adhere to the fabric cell size;

modeling the set of fabric cells based on a set of side springs and a set of diagonal springs;

setting a first spring constant of the set of side springs and a second spring constant of the set of diagonal springs based on the spring constant ratio;

propagating the set of fabric cells along the 3D surface according to the fabric cell size, the first spring constant, and the second spring constant to generate a result of the draping simulation; and flattening the result to obtain a two-dimensional (2D) contour of the fabric by:

identifying a set of nodes in the fabric that are closest to a boundary of the 3D surface; and determining a set of 2D coordinates of the boundary of the 3D surface based on the set of nodes.

25. A method for performing a draping simulation of a fabric, the method comprising:

obtaining a problem definition comprising a fabric cell size, a spring constant ratio, and a three-dimensional (3D) surface;

representing the fabric as a set of fabric cells with dimensions that adhere to the fabric cell size;

modeling the set of fabric cells based on a set of side springs and a set of diagonal springs;

setting a first spring constant of the set of side springs and a second spring constant of the set of diagonal springs based on the spring constant ratio; and propagating the set of fabric cells along the 3D surface according to the fabric cell size, the first spring constant, and the second spring constant to generate a result of the draping simulation, wherein propagating the set of fabric cells comprises:

generating a set of perpendicular geodesic paths from a starting point on the 3D surface to a boundary of the 3D surface; and generating a set of nodes for the set of fabric cells along the set of perpendicular geodesic paths.

26. The method of claim 25, wherein the set of perpendicular geodesic paths are generated using at least one of a fabric orientation or a guide curve.

27. The method of claim 25, wherein propagating the set of fabric cells comprises minimizing forces applied to a first node in a first fabric cell by springs connected to the first node.

28. The method of claim 27, wherein propagating the set of fabric cells further comprises:

when the first node cannot be added to existing fabric cells in the fabric, adding an additional node to an outer boundary of the fabric; and positioning the additional node in the fabric in a way that minimizes forces applied to the additional node by springs connected to the additional node.

29. The method of claim 28, wherein propagating the set of fabric cells further comprises updating positions of the set of nodes in the set of fabric cells to balance nodal internal forces of the set of fabric cells when the set of fabric cells has been propagated along an entirety of the 3D surface.

* * * * *